United States Patent
Schmitzer et al.

(10) Patent No.: US 9,273,234 B2
(45) Date of Patent: Mar. 1, 2016

(54) RELEASE FILM WITH LONG-TERM ANTISTATIC EFFECT

(71) Applicant: HUHTAMAKI FILMS GERMANY GMBH & CO. KG, Forchheim (DE)

(72) Inventors: Siegfried Schmitzer, Kürnach (DE); Jürgen Panhans, Erlangen (DE)

(73) Assignee: Infiana Germany GmbH & Co. KG, Forchheim (DE)

( * ) Notice: Subject to any disclaimer, the term of this patent is extended or adjusted under 35 U.S.C. 154(b) by 585 days.

(21) Appl. No.: 13/726,797

(22) Filed: Dec. 26, 2012

(65) Prior Publication Data

US 2013/0115465 A1 May 9, 2013

Related U.S. Application Data

(63) Continuation of application No. PCT/EP2011/002800, filed on Jun. 8, 2011.

(30) Foreign Application Priority Data

Jul. 2, 2010 (DE) .......................... 10 2010 025 938

(51) Int. Cl.
| | |
|---|---|
| B32B 15/085 | (2006.01) |
| C09J 7/02 | (2006.01) |
| B32B 15/09 | (2006.01) |
| B32B 27/08 | (2006.01) |
| B32B 27/18 | (2006.01) |
| B32B 27/32 | (2006.01) |
| C08L 65/00 | (2006.01) |

(52) U.S. Cl.
CPC ............. *C09J 7/0232* (2013.01); *B32B 15/085* (2013.01); *B32B 15/09* (2013.01); *B32B 27/08* (2013.01); *B32B 27/18* (2013.01); *B32B 27/32* (2013.01); *C09J 7/0235* (2013.01); *B32B 2250/03* (2013.01); *B32B 2250/05* (2013.01); *B32B 2250/242* (2013.01); *B32B 2255/10* (2013.01); *B32B 2255/26* (2013.01); *B32B 2270/00* (2013.01); *B32B 2307/21* (2013.01); *B32B 2307/748* (2013.01); *C08L 65/00* (2013.01); *C09J 2201/602* (2013.01); *C09J 2423/006* (2013.01); *C09J 2453/006* (2013.01); *C09J 2483/005* (2013.01); *Y10T 156/10* (2015.01); *Y10T 428/31533* (2015.04); *Y10T 428/31663* (2015.04)

(58) Field of Classification Search
None
See application file for complete search history.

(56) References Cited

U.S. PATENT DOCUMENTS

| | | | |
|---|---|---|---|
| 4,929,388 A | 5/1990 | Wessling | |
| 6,115,638 A * | 9/2000 | Groenke | ........................ 607/142 |
| 6,552,131 B1 | 4/2003 | Higuchi et al. | |
| 7,125,928 B2 * | 10/2006 | Usuki et al. | .................... 524/560 |
| 2006/0222814 A1 * | 10/2006 | Takahashi et al. | ............. 428/141 |
| 2006/0222867 A1 | 10/2006 | Speith-Herfurth et al. | |
| 2007/0087153 A1 | 4/2007 | Port | |
| 2007/0166523 A1 * | 7/2007 | Fukaya et al. | .............. 428/292.1 |
| 2008/0265215 A1 | 10/2008 | Wessling | |
| 2010/0055445 A1 * | 3/2010 | Wu | ................................ 428/327 |

FOREIGN PATENT DOCUMENTS

| | | | | |
|---|---|---|---|---|
| DE | 34 40 617 C1 | 6/1986 | | |
| DE | 38 34 526 A1 | 4/1990 | | |
| DE | 600 21 716 T2 | 6/2006 | | |
| DE | 10 2005 010 162 A1 | 9/2006 | | |
| EP | 0 445 744 A2 | 9/1991 | | |
| EP | 1 595 927 A1 | 11/2005 | | |
| JP | H10-278203 A | 10/1998 | | |
| JP | 2000052495 A | * | 2/2000 | .............. B32B 27/00 |
| JP | 2005153250 A | * | 6/2005 | .............. B32B 27/00 |
| JP | 2007152930 A | | 6/2007 | |
| JP | 2007190716 A | | 8/2007 | |
| JP | 2009241388 A | | 10/2009 | |
| JP | 2010006079 A | * | 1/2010 | .............. B32B 27/00 |
| WO | 2010-021796 A2 | | 2/2010 | |

OTHER PUBLICATIONS

Dictionary.com definition of adjoin, 4 pages, 2015.*
English language machine translation of JP-2000-052495, 12 pages, translation generated Jul. 2015.*
English language machine translation of JP-2005-153250, 6 pages, translation generated Jul. 2015.*
English language machine translation of JP-2010-006079, 6 pages, translation generated Jul. 2015.*
G. Inzelt, "Conducting polymers", Springer Verlag, Mar. 2008.
T.A. Skotheim and J. Reynolds, "Conjugated Polymers", Theory, Synthesis, Properties, and Characterization (Handbook of Conducting Polymers, Third Edition), 2006.
International Search Report dated Dec. 7, 2011, mailed Dec. 15, 2011.
Translation of International Search Report dated Dec. 7, 2011, mailed Dec. 15, 2011.
German Search Report dated Apr. 4, 2011.

* cited by examiner

*Primary Examiner* — Robert S Loewe

(74) *Attorney, Agent, or Firm* — Norris McLaughlin & Marcus PA

(57) ABSTRACT

Release film furnished on at least one side with a release layer (c) based on at least one cured polysiloxane, the film comprising at least one inner layer (a) based on at least one thermoplastic polymer, equipped with at least one at least oligomeric compound having a long-term antistatic effect, as antistat, and at least one layer (b) based on at least one thermoplastic polymer; method for producing the release film, and the use thereof as a detachable protective or masking film.

11 Claims, No Drawings

RELEASE FILM WITH LONG-TERM ANTISTATIC EFFECT

This application is a Continuation of PCT/EP2011/002800, filed Jun. 8, 2011, which claims foreign priority benefit under 35 U.S.C. §119 of German Patent Application 10 2010 025 938.1 filed Jul. 2, 2010, the contents of all of which are incorporated herein by reference.

The present invention relates to a release film equipped on at least one side with a release layer (c) and comprising at least one inside layer (a) based on at least one thermoplastic polymer, equipped with at least one at least oligomeric compound having a long-term antistatic effect, as antistat, and at least one layer (b) based on at least one thermoplastic polymer, the release layer (c) thereof being based on a cured polysiloxane, to a method for producing said film, and to the use thereof as a detachable protective or liner film.

BACKGROUND OF THE INVENTION

Multilayer films made from thermoplastics and having a release layer based, for example, on a silicone polymer are widely used as release films for adhesive tapes or self-adhesive labels, in order to prevent these single-sidedly or double-sidedly adhesive products from sticking to one another in the course of storage. A disadvantage of such release films, however, is that in the course of production, storage, and processing they undergo static charging and as a result suffer blocking, thereby hindering their processing. Since such unwanted static charging occurs in particular via the release layer, especially based on a silicone layer, discharging may be accompanied by at least partial destruction of the release layer and by blocking of the layer of adhesive by the damaged silicone layer.

Typically, therefore, antistatically equipped release films are used in order to avoid instances of static charging in the course of production, processing and/or storage.

Antistats are substances which are incorporated for instance into a plastics material or are applied to the surface of a plastics article in order to reduce electrostatic charging, thereby making it possible to reduce not only dust attraction but also spark discharge. The electrostatic charging of a plastic can be reduced by raising the surface conductivity or the volume conductivity.

The prior art already discloses release films which are antistatically equipped.

Thus EP 0 445 744 A2 describes a multilayer polyester film with antistatic effect which in addition to the release layer has a further layer comprising a cationic quaternary nitrogen compound as antistat.

US 2006/0222867 A1 describes a multilayer film which as well as the release layer has a further layer which comprises an alkoxylated amine as antistat.

A disadvantage affecting release films equipped in these ways is that their antistatic effect is not long-term, but instead is merely temporary. Moreover, as a result of their tendency to migrate into other layers of the release film, the antistats used may have negative consequences for the release properties and/or for the tensile strength and/or for the adhesion of the layer assembly of the release film. This may occur especially in the case of multilayer release films in which the antistats have been incorporated into an inside layer and are therefore able to migrate outwardly through a number of layers. These negative consequences usually increase in proportion to the amount of antistats that are employed, and so for that reason as well their proportion, relative to the release film as a whole, is to be minimized.

There is therefore a need for release films which do not have the disadvantages identified above.

It was an object of the present invention, therefore, to provide a release film which in spite of a sufficient long-term antistatic effect has no more than a negligible influence on the release properties and mechanical properties as a result of the antistat.

SUMMARY OF THE INVENTION

This object is achieved by the provision of a release film of the invention, equipped on at least one side of the release layer (c), based on a cured polysiloxane, and comprising
- (a) at least one inside layer (a) based on at least one thermoplastic polymer, equipped with at least one at least oligomeric compound having a long-term antistatic effect, as antistat, and
- (b) at least one layer (b) based on at least one thermoplastic polymer.

It has surprisingly been found that with the release film of the invention it is possible to achieve a long-term antistatic effect despite the fact that the layer (a) equipped with the at least oligomeric compound with long-term antistatic effect, as antistat, is an inside layer and that located between the surface of the release film and this thus-equipped layer (a) there is always at least one more apolar layer in the form of the layer (b) and/or in the form of a release layer (c) based on a cured polysiloxane, which would have been expected to block the antistatic effect. Surprisingly, nevertheless, a long-term antistatic effect is achieved, although the release layer (c) is based on at least one cured polysiloxane. In particular, the release film of the invention is notable, in the case of static charging, for a very good abatement effect.

DETAILED DESCRIPTION

The term "abatement effect" in the sense of this invention refers to discharging, for example, of the release film of the invention, within 30 seconds after a static charge, by at least 60%, preferably by at least 70%, more preferably by at least 80%, very preferably by at least 90%, more particularly completely, by 100%.

It has also surprisingly been found that by equipping the layer (a) with the at least oligomeric compound having long-term antistatic effect, as antistat, virtually no effect can be ascertained on the release characteristics and on the mechanical properties such as tensile strength and/or adhesion strength of the release film.

The term "long-term antistatic effect" refers in the sense of this invention to a consistently strong antistatic effect on the part of the release film of the invention, over a period of at least 3, preferably at least 5, more preferably at least 10, very preferably at least 12 months, the long-term antistatic effect being unaffected by the relative atmospheric humidity of the environment, which possibly changes.

Suitable for producing the layer (a) of the release film of the invention is at least one thermoplastic polymer.

The layer (a) of the release film of the invention is suitably produced preferably from at least one thermoplastic polymer selected from the group comprising polyolefins, polystyrenes, polyamides, polyesters, and copolymers of at least two monomers of the stated polymers, preferably on at least one olefin homopolymer or copolymer.

For producing the layer (a) it is possible with preference to use of thermoplastic polyolefins, thermoplastic olefin homopolymers or copolymers of $\alpha,\beta$-unsaturated olefins having 2-10 carbon atoms such as, for example, polyethylenes (PE, more particularly LDPE or HDPE), polypropylenes (PP), polybutylenes (PB), polyisobutylenes (PI), or mixtures of at least two of the stated polymers. "LDPE" refers to low-density polyethylene, which has a density in the range of 0.86-0.93 g/cm$^3$ and is notable for a high degree of branching of the molecules. "HDPE" refers to high-density polyethylene, which has only a low level of branching of the molecule chain; the density can be in the range between 0.94 and 0.97 g/cm$^3$. Preferred polyolefins for producing the layer (a) are ethylene homopolymers or copolymers and propylene homopolymers or copolymers.

Also suitable for producing the layer (a) are thermoplastic homopolymers or copolymers of styrene such as, for example, polystyrene.

If polyamides are used for producing the layer (a), then thermoplastic aliphatic, semiaromatic or aromatic polyamide homopolymers or copolymers are suitable. Such polyamides are polyamides formed from diamines such as aliphatic diamines having 2-10 carbon atoms, more particularly hexamethylenediamine, or aromatic diamines having 6-10 carbon atoms, more particularly p-phenylenediamine, and dicarboxylic acids such as aliphatic or aromatic dicarboxylic acids having 6-14 carbon atoms such as, for example, adipic acid, terephthalic acid, or isoterephthalic acid. The polyamides may additionally have been prepared from lactams having 4-10 carbon atoms such as, for example, ε-caprolactam. Particularly suitable polyamides for producing the layer (a) are, for example, PA 6, PA 12, PA 66, PA 61, PA 6T and/or mixtures of at least two of the stated polyamides.

As polyesters for producing the layer (a) it is possible to use thermoplastic, aliphatic, partially aromatic or aromatic polyester homopolymers or copolymers. Such polyesters derive from polyols such as, for example, ethylene glycol or 1,4-butanediol, and dicarboxylic acids or dicarboxylic acid derivatives such as adipic acid, and/or terephthalic acid. For producing the layer (a) it is also possible in accordance with the invention to use polycarbonates (PC) as polyesters. Of preferred suitability are polybutylene adipate (PBA), polyethylene terephthalate (PET), polybutylene terephthalate (PBT) or the corresponding copolymers.

The at least oligomeric compound with long-term antistatic effect which is used in accordance with the invention as antistat is preferably a nonmigrating antistat, i.e., an antistat which exhibits no migration tendencies into other layers of the release film of the invention and which therefore remains in the inside layer (a) equipped with the antistat.

Moreover, the antistats employed are notable for a long-term antistatic effect, which is uninfluenced by the relative atmospheric humidity of the environment.

In one preferred embodiment of the release film of the invention, the layer (a) has at least one polymeric compound with long-term antistatic effect as the antistat.

In accordance with the invention it is preferred not to use any ionomers as antistats—that is, no olefin (meth)acrylic acid copolymers or their salts.

As the antistat it is preferred to use at least one intrinsically conducting polymer, the intrinsically conducting polymer being doped in each case, or at least one polyetherpolyamide block copolymer.

In one preferred embodiment of the release film of the invention, the antistats used in accordance with the invention are polyetherpolyamide block copolymers, i.e., block copolymers comprising at least one polyamide block and at least one polyether block.

These block copolymers can be prepared using aliphatic, partially aromatic or aromatic polyamides. These polyamides derive from aliphatic diamines having 2-10 carbon atoms, such as hexamethylenediamine, for example, or from aromatic diamines having 6-10 carbon atoms, such as p-phenylenediamine, for example, and aliphatic or aromatic dicarboxylic acids having 6-14 carbon atoms such as, for example, adipic acid, terephthalic acid or isoterephthalic acid. Moreover, the polyamides may derive from lactams having 4-10 carbon atoms such as, for example, ε-caprolactam. Polyamide blocks used are preferably PA 6, PA 12, PA 66, PA 61 and/or PA 6T with a molecular weight of 300 to 100 000 g/mol, preferably from 500 to 80 000 g/mol, preferably from 1000 to 50 000 g/mol. For preparing the block copolymers it is possible to use (cyclo)aliphatic, semiaromatic or aromatic polyethers which have a repeating structural unit —[—O—X—]—, where X is an aliphatic, cycloaliphatic, aromatic or aromatic-aliphatic radical. Preferred polyethers are polyethylene oxides, polypropylene oxides, poly(trimethylene) oxides, polybutylene oxides, polystyrene oxides, ethylene oxide/propylene oxide copolyethers, poly(tetrahydrofurans), copolymers of structural units of the stated polyethers or mixtures of at least two of the stated polyethers. The polyethers preferably have a molecular weight of 100 to 50 000 g/mol, more preferably of 150 to 30 000 g/mol, very preferably of 200 to 10 000 g/mol.

The term "intrinsically conducting polymers" is understood in the sense of this invention to refer to polymers which in the nonconducting state have a conjugated π-electron system and which have been converted into a conducting form by doping, in other words by at least partial oxidation, reduction, protonation and/or deprotonation. The volume conductivity of the intrinsically conducting polymers employed in accordance with the invention is preferably at least $10^{-14}$ S/cm and not more than $10^8$ S/cm, and can be determined in accordance with the IEC 61620 standard.

In another preferred embodiment of the release film of the invention, the antistats used in accordance with the invention are intrinsically conducting polymers which are obtained preferably by doping of at least one polymer selected from the group encompassing polyacetylenes (PAC), preferably emeraldine and leucoemeraldine, polyanilines (PANI), polypyrroles (PPy), poly-para-phenylenes (PPP), poly-para-phenylene sulfides (PPS), polyphenylenevinylenes (PPV), polyfluorenes (PFO), polythiophenes (PT), more preferably poly(3-alkyl)thiophenes, polytetrathiafulvalenes, polynaphthylenes, polyisothianaphthylenes (PITN), polyphthalocyanines (PPc), and poly-3,4-diethylenedioxythiophenes (PEDOT or PEDT).

These intrinsically conducting polymers may be chemically uniform in their construction or may be composed of different monomers. The above-stated doped intrinsically conducting polymers are typically prepared, prior to their doping, by polymerization techniques that are known to the skilled person, such as, for example, polycondensation, ring-opening polymerization, thermal polymerization or by chemical oxidative or reductive polymerization or by electrochemical oxidative or reductive polymerization (anodic or cathodic polymerization) of the corresponding monomers, preferably in aqueous or organic reaction media, optionally with use of at least one acid or at least one base. Examples of suitable chemical oxidizing agents include halogens, preferably bromine, chlorine or iodine, peroxides, peracids, perchlorates, and persulfates, preferably ammonium persulfate. Examples of suitable chemical reducing agents include alkali metals or alkaline earth metals.

The intrinsically conducting polymers used as antistats in accordance with the invention are in each case doped. This doping of the aforementioned polymers is accomplished with at least one suitable dopant, leading to an at least partial oxidation, reduction, protonation and/or deprotonation of the doped polymer. Doping may be performed actually during the polymerization, or subsequent to it.

The dopant is preferably selected from the group encompassing halogens, preferably bromine, chlorine, or iodine, perchlorates, peroxides, persulfates, alkali metals, alkaline earth metals, organic acids and acid anhydrides, preferably selected from the group encompassing trifluoroacetic acids, propionic acids, sulfonic acids, preferably toluenesulfonic acids or methanesulfonic acids, inorganic acids, preferably selected from the group encompassing inorganic Lewis acids, and more preferably halides of elements from main groups three or five of the periodic system, very preferably halides of boron, indium, aluminum, gallium, phosphorus, or antimony, more particularly boron trifluoride, indium trifluoride, and protic acids such as hydrochloric acid or sulfuric acid, for example, and polymer-bonded dopants, preferably polystyrenesulfonic acids (PSSH), poly(vinylsulfonic acids), and polypropanesulfonic acids.

Detailed information on the preparation of intrinsic polymers can be found for example in G. Inzelt, *Conducting polymers,* 2008, Springer Verlag, or T. A. Skotheim, J. Reynolds, *Conjugated Polymers: Theory, Synthesis, Properties, and Characterization* (Handbook of Conducting Polymers, Third Edition), 2006, CRC press. The corresponding disclosure is hereby introduced as disclosure of the present specification. Intrinsic polymers are marketed products.

In one preferred embodiment of the release film of the invention, the layer (a) has 10%-20% by weight, preferably 11%-16% by weight, based in each case on the total weight of the layer (a), of at least one antistat.

In one preferred embodiment, the release film of the invention has 0.5%-3.0% by weight, preferably 1.0%-2.5% by weight, based in each case on the total weight of the release film, of at least one antistat.

In one preferred embodiment, the antistat is added in multiparticulate form, more preferably finely divided in powder form, during the production of the release film.

The antistat preferably tends toward incompatibility with the thermoplastic polymer that is used for producing the layer (a), in other words with the matrix polymer of the layer (a). Because of the incompatibility, the production of the layer (a), and more particularly the cooling, is accompanied by formation of a kind of network of the antistat within the layer (a).

The melting point of the antistat ought preferably to be at least 10° C., more preferably at least 20° C., very preferably at least 30° C. higher than the melting point of the thermoplastic polymer on which the layer (a) is based.

The release film of the invention preferably has at least two inside layers (a), more preferably two layers (a) (the layers ($a_1$) and ($a_2$)), each of which is equipped with an antistat. In this case the total amount, based on the layers ($a_1$) and ($a_2$), of the doped antistat corresponds preferably to the total amount indicated above for the antistat. The two layers ($a_1$) and ($a_2$) may be equipped with an identical antistat or with a different antistat. In that case the two layers ($a_1$) and ($a_2$) may be equipped with an identical or different amount of the antistat.

In one preferred embodiment, the release film of the invention has a layer (a) which is equipped directly with the release layer (c) as surface layer.

The layer (a) of the release film of the invention preferably as a layer thickness of 5 µm to 100 µm, more preferably of 10 µm to 90 µm, very preferably of 20 µm to 80 µm.

The ratio of the total thickness of the release film of the invention to the total layer thickness of the layer(s) (a) is preferably in the region of at least 2:1, preferably at least 3:1, more preferably at least 4:1, very preferably at least 7:1.

For producing the layer (b) of the release film of the invention the same thermoplastic polymers which can also be used for producing the layer (a), are suitable and the respective layer may be based on the same or on a different kind of polymers.

Of preferential suitability for producing the layer (b) of the release film of the invention is at least one thermoplastic olefin homopolymer or copolymer, more preferably at least one thermoplastic olefin homopolymer or copolymer selected from the group encompassing ethylene homopolymers or copolymers and propylene homopolymers or copolymers, very preferably at least one polyethylene or polypropylene.

The layer (b) of the release film of the invention preferably has a layer thickness of 5 µm to 100 µm, more preferably of 10 µm to 90 µm, very preferably of 20 µm to 80 µm.

In one preferred embodiment of the release film of the invention, the layer (b) is adjacent to an inside layer (a) and preferably has a release layer (c) on its other surface, or boundary surface.

In another preferred embodiment of the release film of the invention, the release film has a symmetrical construction in relation to a central layer (b).

In a further preferred embodiment of the release film of the invention, the release film has an asymmetrical construction in relation to a central layer (b).

The release layer (c) of the release film of the invention is based preferably on at least one curable polysiloxane.

The term "polysiloxane" is understood in the sense of the present invention to refer to compounds whose polymer chains are constructed alternately of silicon atoms and oxygen atoms. A polysiloxane is based on n repeating siloxane units $(-[Si(R_2)-O]-)_n$, which in each case independently of one another are disubstituted by two organic radicals R, with R preferably in each case being $R^1$ or $OR^1$, and $R^1$ in each case being an alkyl radical or an aryl radical. The cured polysiloxane of the invention is based preferably on a repeating dialkylsiloxane unit or on a repeating alkylarylsiloxane unit. Depending how many Si—O bonds an individual siloxane unit has, based in each case on a tetravalent silicon atom, these units may be differentiated into terminal monofunctional siloxanes (M) having one Si—O bond, difunctional siloxanes (D) having two Si—O bonds, trifunctional siloxanes (T) having three Si—O bonds, and tetrafunctional siloxanes (Q) having four Si—O bonds. The polysiloxane used in accordance with the invention preferably has a crosslinked cyclic or chainlike structure, more preferably a crosslinked chainlike structure, which is linked by (D), (T) and/or (Q) units to form a two- or three-dimensional network. The number n of the repeating siloxane units $(-[Si(R_2)-O]-)_n$ in the polysiloxane chain is referred to as the degree of polymerization of the polysiloxane.

The release layer (c) is based preferably on at least one cured, i.e., crosslinked, polysiloxane selected from the group encompassing addition-crosslinked, preferably addition-crosslinked with metal catalysis, condensation-crosslinked, radically-crosslinked, and cationically crosslinked polysiloxanes, and/or polysiloxanes crosslinked by moisture exposure.

The release layer (c) is preferably based on at least one cured polysiloxane which has been cured by thermal curing, by curing with electromagnetic radiation, preferably by UV radiation, or by moisture exposure. More preferably the release layer (c) of the release film of the invention is based on at least one cured polysiloxane selected from the group encompassing polydialkylsiloxanes, preferably polydimethylsiloxanes, and polyalkylarylsiloxanes, preferably polymethylphenylsiloxanes, which in each case are cured.

Thermally cured polysiloxanes are obtained by thermal hydrosilylation of polysiloxanes containing silane functions and with a compound containing at least one carbon double bond. In the case of the polysiloxanes cured by electromagnetic radiation, the crosslinking of the polysiloxanes is effected by electromagnetic radiation, preferably by UV radiation. The polysiloxanes crosslinked by exposure to moisture, preferably to water, are obtained by a polycondensation reaction in which at least one silane function and at least one alkoxy group or at least one alkoxysilane group form an Si—O bond, accompanied by elimination of at least one molecule of alcohol. The polysiloxanes to be cured therefore have in each case the inter-reacting functional groups that are required for crosslinking.

The release layer (c) of the release film of the invention preferably has a layer thickness of 0.1 μm to ≤3 μm, preferably of 0.2 μm to 1.5 μm.

The release film of the invention is equipped with a release layer (c) at least on one side, on one of its surfaces.

In another preferred embodiment, the release film of the invention may also be equipped with a release layer (c) on both sides, on both surfaces.

In a very preferred embodiment, the release film of the invention has a central layer (b) which is joined on each of its surfaces to a respective layer (a), with both free surfaces of the layer (a) being equipped with a release layer (c).

In another very preferred embodiment, the release film of the invention has a central layer (a) which is joined on each of its surfaces to a respective layer (b), with at least one of the two free surfaces of the layers (b) being equipped with a release layer (c).

In a further very preferred embodiment, the release film of the invention has a central layer (b) which is joined on one of its surfaces or boundary surfaces to a layer (a), and on its other surface or boundary surface to a second layer (b), the free surface of the layer (a) being equipped with a release layer (c), and the free surface of the second layer (b) being optionally equipped with a release layer (c).

In a further very preferred embodiment, the release film of the invention has a central layer (b) which is joined on each of its surfaces to a layer (a) (layers ($a_1$) and ($a_2$)), the free surfaces or boundary surfaces of these layers (a) (layers ($a_1$) and ($a_2$)) being joined in each case to a further layer (b), with at least one of the two free surfaces of these layers (b) being equipped with a release layer (c).

In one preferred embodiment of the release film of the invention, the surface of the release film that is equipped with the release layer (c) may have an asymmetric structure in line with the geometry of the particulated antistat distributed in the layer (a). Preferably the entire surface of the release film that is equipped with a release layer (c) has such an asymmetric structure, with an asymmetric structure being understood preferably to mean repeating elevations and depressions on the surface. The elevations of the asymmetric structure of the release film of the invention, which are provided as substrate contact points for detachment, in this case preferably have a height of ≥2 μm, preferably of ≥4 μm, more preferably of ≥6 μm, through the added antistat.

The release layer (c) and also the layers (a) and (b) may, if necessary, in each case independently of one another, have been doped with adjuvants selected from the group encompassing antioxidants, antiblocking agents, antifogging agents, active antimicrobial ingredients, light stabilizers, UV absorbers, UV filters, dyes, color pigments, stabilizers, preferably heat stabilizers, process stabilizers, and UV and/or light stabilizers, preferably based on at least one sterically hindered amine (HALS), processing aids, flame retardants, nucleating agents, crystallizing agents, preferably crystal nucleators, lubricants, optical brighteners, flexibilizing agents, sealing agents, plasticizers, silanes, spacers, fillers, peel additives, waxes, wetting agents, surface-active compounds, preferably surfactants, and dispersants. In this case the release effect of the release layer (c) must not be affected, and must be retained. Furthermore, the long-term antistatic effect of the antistat in the layer (a) must not be affected and must be retained.

The release layer (c) and also the layers (a) and (b) can, if necessary, in each case independently of one another, contain at least 0.01-30% by weight, preferably at least 0.1-20% by weight, based in each case on the total weight of an individual layer, of at least one of the above-stated adjuvants.

Preferably at least one surface of the release film, more preferably the release film surface that is equipped with the release layer (c), has a surface resistance of $1 \cdot 10^9$ to $9 \cdot 10^{13} \Omega$, more preferably of $1 \cdot 10^9$ to $9 \cdot 10^{11} \Omega$. The surface resistance is determined in accordance with DIN IEC 93 VDE 0303 or by method 2 as specified below, and is reported in [106].

The release film of the invention preferably has a total layer thickness of 15 μm to 300 μm, more preferably of 30 μm to 250 μm, very preferably of 40 μm to 200 μm.

The present invention further provides a process for producing the release film of the invention.

The release film of the invention can be produced by known production processes such as lamination or (co)extrusion, for example, preferably by coextrusion. Here it should be ensured that the doping of the layer (a) with the antistat employed in accordance with the invention is accomplished by blending the antistat or by blending a masterbatch of antistat and a thermoplastic polymer suitable for producing the layer (a), with a thermoplastic polymer used for producing the layer (a). This blending may take place as a dry operation, in granule/powder or granule/granule form. It is also possible, however, to add the antistat to the melt of the thermoplastic polymer for producing the layer (a), preferably by metered introduction in an extruder used for extruding the layer (a).

In this context it is possible both for individual and for all layers (a) and (b) of the release film of the invention to be formed by extrusion, preferably by flat-film extrusion (cast extrusion) or blown-film extrusion, more particularly by flat-film coextrusion (cast coextrusion) or blown-film coextrusion.

In one preferred embodiment, the layers (a) and (b) of the release film of the invention may be produced and processed as an entire multilayer film assembly, in the form of a tubular film.

In another preferred embodiment, the layers (a) and (b) of the release film of the invention can be produced and processed in their entirety as a cast film assembly.

Accordingly, the individual layers (a) and (b) of the release film of the invention can be produced preferably by (co) extrusion.

The layer (a), equipped with at least one at least oligomeric compound having a long-term antistatic effect, as antistat, or the layer (b), or a layer assembly comprising at least one such layer (a), equipped with at least one antistat used in accordance with the invention, and at least one layer (b), is equipped, preferably by coating, on one surface or on both surfaces, i.e., single-sidedly or double-sidedly, preferably just single-sidedly, with the release layer (c) based on at least one as yet uncured polysiloxane and also, optionally, on at least one above-stated adjuvant, and is joined to at least one of the aforementioned layers or layer assemblies. The curing of the yet not cured polysiloxane or of the mixture of the yet not cured polysiloxane and at least one above-stated adjuvant to form the release layer (c) is accomplished preferably by exposure to heat or to electromagnetic radiation, optionally by addition of at least one UV initiator and/or one radical initiator to the uncured polysiloxane or to the mixture. If desired, the release film can be embossed after coating or curing.

The respective production processes and corresponding manufacturing parameters are common knowledge to the skilled person.

In one preferred embodiment, a multilayer assembly of at least one layer (a) equipped with at least one antistat and of at least one layer (b) is produced by (co)extrusion, with melting of the respective component, or by lamination, and the assembly is subsequently coated on at least one surface with a release layer (c), and, by exposure to heat or electromagnetic radiation, optionally by addition of at least one UV initiator and/or one radical initiator, the release layer (c) based on polysiloxane is joined to the rest of the assembly and cured.

Each of the layers (a) and (b) of the release film of the invention may optionally be subjected to a surface treatment such as, for example, a Corona treatment, a plasma treatment and/or a flame treatment, preferably prior to the application of at least one release layer (c), and with particular preference a Corona treatment is performed.

The release film of the invention may preferably be printed and/or colored and/or embossed.

The release film of the invention is preferably used as a removable protective film or removable liner film.

The present invention accordingly further provides for the use of the release film of the invention as a removable protective or liner film, preferably for adhesive layers of self-adhesive labels, adhesive tapes, and/or stickers.

The release film of the invention can also be used as an interlayer film, preferably as a film between blanks.

The present invention accordingly further provides for the use of the release film of the invention as and interlayer film, preferably as a film between blanks.

Determination of Surface Resistance

Method 1:

The surface resistance can be determined in accordance with DIN IEC 93 VDE 0303 and reported in [Ω].

Method 2:

The surface resistance of the release film of the invention may alternatively be determined as described below, and reported in [Ω]:

A sample of a release film of the invention or of a comparative film (300 mm×100 mm) is inserted, by the surface on which the surface resistance is to be determined, into a suitable measuring instrument for determining the electrostatic properties of polymeric films, such as, for example, into the QUMAT®-428 instrument from Quma (Wuppertal, Germany), with the assistance of magnetic tensioners. First of all, the field strength present on the surface under investigation of the respective sample is noted, in kV/m, and then the surface of the sample is discharged, and is subsequently charged to a particular, defined field strength. After that, the decrease in field strength is measured within a defined time interval, such as over the course of 30 seconds, for example. The surface resistance of the surface of the respective sample that has been investigated can be calculated from the measurement values found.

The inventive and comparative examples below serve to illustrate the invention, but should not be interpreted as conferring any restriction.

I. CHEMICAL CHARACTERIZATION OF THE RAW MATERIALS USED

Antistat A: Cesa-Stat® OCA 0025612 from Clariant (polyetherpolyamide block copolymer)

II. PRODUCTION OF THE RELEASE FILMS

The individual layers of the release films according to examples 1-8 (B1-B8) are directly adjacent to one another in the sequence indicated in those examples. The layer assembly comprising the layers (a) and (b) of the release film according to examples B1-B8 was produced by blown-film coextrusion, and coated on one or both sides with a release layer (c) in a downstream operation.

III. EXAMPLES

All % figures below are % by weight in each case.

III.1 Example 1 (B1)

| Layer construction B1, (layer thickness) | Raw materials B1 |
| --- | --- |
| Release layer (c) (1.0 µm) | Polysiloxane (100%) |
| Layer (b) (23 µm) | Polypropylene (100%) |
| Layer (a) (34 µm) | Polypropylene (86%), A (14.0%) |
| Layer (b) (23 µm) | Polypropylene (100%) |
| Release layer (c) (1.0 µm) | Polysiloxane (100%) |

III. 2 Example 2 (B2)

| Layer construction B2, (layer thickness) | Raw materials B2 |
| --- | --- |
| Release layer (c) (1.0 µm) | Polysiloxane (100%) |
| Layer (b) (14 µm) | Polypropylene (100%) |
| Layer (a) (22 µm) | Polypropylene (86%), A (14.0%) |
| Layer (b) (14 µm) | Polypropylene (100%) |

III.3 Example 3 (B3)

| Layer construction B3, (layer thickness) | Raw materials B3 |
| --- | --- |
| Release layer (c) (0.5 µm) | Polysiloxane (100%) |
| Layer (a) (17 µm) | Polypropylene (86%), A (14.0%) |
| Layer (b) (26 µm) | Polypropylene (100%) |
| Layer (b) (17 µm) | Polypropylene (100%) |
| Release layer (c) (0.5 µm) | Polysiloxane (100%) |

III.4 Example 4 (B4)

| Layer construction B4, (layer thickness) | Raw materials B4 |
| --- | --- |
| Release layer (c) (1.1 µm) | Polysiloxane (100%) |
| Layer (a) (23 µm) | LDPE (86%), A (14.0%) |

-continued

| Layer construction B4, (layer thickness) | Raw materials B4 |
|---|---|
| Layer (b) (34 μm) | LDPE (100%) |
| Layer (b) (23 μm) | LDPE (100%) |

III.5 Example 5 (B5)

| Layer construction B5, (layer thickness) | Raw materials B5 |
|---|---|
| Release layer (c) (0.5 μm) | Polysiloxane (100%) |
| Layer (b) (23 μm) | HDPE (100%) |
| Layer (a) (11 μm) | HDPE (86%), A (14.0%) |
| Layer (b) (12 μm) | HDPE (100%) |
| Layer (b) (11 μm) | HDPE (100%) |
| Layer (b) (23 μm) | HDPE (100%) |
| Release layer (c) (1.0 μm) | Polysiloxane (100%) |

III.6 Example 6 (B6)

| Layer construction B6, (layer thickness) | Raw materials B6 |
|---|---|
| Release layer (c) (1.0 μm) | Polysiloxane (86%), |
| Layer (a) (8 μm) | Polypropylene (100%) A (14.0%) |
| Layer (b) (14 μm) | Polypropylene (100%) |
| Layer (a) (8 μm) | Polypropylene (86%), A (14.0%) |
| Release layer (c) (1.0 μm) | Polysiloxane (100%) |

III.7 Example 7 (B7)

| Layer construction B7, (layer thickness) | Raw materials B7 |
|---|---|
| Release layer (c) (1.0 μm) | Polysiloxane (100%) |
| Layer (b) (28 μm) | Polypropylene (100%) |
| Layer (a) (14 μm) | Polypropylene (86%), A (14.0%) |
| Layer (b) (14 μm) | Polypropylene (100%) |
| Layer (b) (14 μm) | Polypropylene (100%) |
| Layer (a) (28 μm) | Polypropylene (86%), A (14.0%) |
| Release layer (c) (1.1 μm) | Polysiloxane (100%) |

III.8 Example 8 (B8)

| Layer construction B8, (layer thickness) | Raw materials B8 |
|---|---|
| Release layer (c) (0.6 μm) | Polysiloxane (100%) |
| Layer (b) (55 μm) | HDPE (100%) |
| Layer (a) (26 μm) | HDPE (86%), A (14.0%) |
| Layer (b) (28 μm) | HDPE (100%) |
| Layer (b) (28 μm) | HDPE (100%) |
| Layer (b) (28 μm) | HDPE (100%) |

IV. LONG-TERM ANTISTATIC EFFECT

The long-term nature of the antistatic effect of the release films of examples 1-8 (B1-B8) was determined by determining the surface resistance on each of the two surfaces of the release films, in accordance with method 2 described above, this determination being carried out using the QUMAT®-428 instrument from Quma, and the decrease in field strength being measured within a time interval of 30 seconds. For each surface this gave a surface resistance in the range from $1.10^9$ to $9.10^{11} \Omega$ in each case, on measurement immediately after production of the release films.

Each of the release films according to examples 1-8 (B1-B8) was stored for 12 months after the initial measurement, and the surface resistance was determined in each case on each surface of the individual release films according to examples 1-8 (B1-B8) by means of method 2. For all of the release films, a surface resistance in the range from $1.10^9$ to $9.10^{11}$ was found again in each case for each surface. Storage took place under standard ambient conditions, i.e., at a room temperature of approximately 23° C. The surface resistance values ascertained were independent of the relative atmospheric humidity of the environment. The long-term antistatic effect is therefore uninfluenced by a change in the relative atmospheric humidity.

The invention claimed is:

1. A release film equipped on at least one side with a release layer (c) and comprising
   (a) at least one inside layer (a) formed of at least one thermoplastic polymer, equipped with 10%-20% by weight, based on the total weight of the layer (a), of at least one polyetherpolyamide block copolymer having a long-term antistatic effect over a period of at least 12 months which is independent of the relative atmospheric humidity, as antistat, and
   (b) at least one layer (b) formed of at least one thermoplastic polymer, wherein the release layer (c) is formed of at least one cured polysiloxane.

2. A release film as claimed in claim 1, wherein the inside layer (a) has 11%-16% by weight, based on the total weight of the layer (a), of the antistat.

3. A release film as claimed in claim 1, wherein the release film comprises at least two inside layers (a) (layers ($a_1$) and ($a_2$)) each equipped with the antistat.

4. A release film as claimed in claim 1, wherein the layer (a) is based on at least one thermoplastic polymer selected from the group consisting of polyolefins, polystyrenes, polyamides, polyesters, and copolymers of at least two monomers of said polymers.

5. A release film as claimed in claim 1, wherein a layer (a) is equipped directly with the release layer (c) as surface layer.

6. A release film as claimed in claim 1, wherein a layer (b) is equipped directly with the release layer (c) as surface layer.

7. A release film as claimed in claim 6, wherein the layer (b) adjoins by its other boundary surface an inside layer (a).

8. A release film as claimed in claim 1, wherein the ratio of the total layer thickness of the release film to the total layer thickness of the layer(s) (a) is in the region of at least 2:1.

9. A release film as claimed in claim 1, wherein the layer (b) is formed of at least one olefin homopolymer or copolymer.

10. A method for producing the release film of claim 1, wherein a layer assembly of at least one layer (a) equipped with at least one polyetherpolyamide block copolymer having a long-term antistatic effect over a period of at least 12 months which is independent of the relative atmospheric humidity, as antistat, and with at least one layer (b) is produced by (co)extrusion or by lamination and the layer assembly is equipped at least on one of its surfaces with a release layer (c).

11. A detachable protective or liner film, comprising the release film of claim 1.

* * * * *